(12) United States Patent
Pang et al.

(10) Patent No.: US 11,573,198 B2
(45) Date of Patent: Feb. 7, 2023

(54) FLUIDIC APPARATUS FOR DETECTION OF A CHEMICAL SUBSTANCE, A BIOSENSOR AND A METHOD OF FABRICATING THE FLUIDIC APPARATUS

(71) Applicant: City University of Hong Kong, Kowloon (HK)

(72) Inventors: Stella W. Pang, Kowloon (HK); Shuyan Zhu, Kowloon (HK)

(73) Assignee: City University of Hong Kong, Kowloon (HK)

( * ) Notice: Subject to any disclaimer, the term of this patent is extended or adjusted under 35 U.S.C. 154(b) by 612 days.

(21) Appl. No.: 16/532,636

(22) Filed: Aug. 6, 2019

(65) Prior Publication Data
US 2021/0041394 A1 Feb. 11, 2021

(51) Int. Cl.
G01N 27/447 (2006.01)
G01N 21/41 (2006.01)
B03C 5/00 (2006.01)
G01N 21/31 (2006.01)

(52) U.S. Cl.
CPC ....... *G01N 27/44721* (2013.01); *B03C 5/005* (2013.01); *G01N 21/31* (2013.01); *G01N 21/4133* (2013.01); *G01N 27/44791* (2013.01)

(58) Field of Classification Search
None
See application file for complete search history.

(56) References Cited

U.S. PATENT DOCUMENTS

2014/0131204 A1* 5/2014 Chou ................... B03C 5/005
204/452

OTHER PUBLICATIONS

A. Barik, et al., "Dielectrophoresis-Assisted Raman Spectroscopy of Intravesicular Analytes on Metallic Pyramids", Analytical Chemistry, 88(3): p. 1704-1710, (Year: Feb. 2016).*

* cited by examiner

*Primary Examiner* — J. Christopher Ball
(74) *Attorney, Agent, or Firm* — Renner Kenner Greive Bobak Taylor & Weber

(57) ABSTRACT

A fluidic apparatus for detection of a chemical substance, a biosensor, and a method of fabricating the fluidic apparatus. The fluidic apparatus includes a fluidic structure arranged to receive a sample containing a target substance, and a trapping structure, in fluid communication with the fluidic structure and arranged to immobilize the target substance in a detection region, wherein the detection region of the trapping structure is arranged to alter a physical characteristic of an incident light signal which represents a concentration of the target substance contained in the sample.

30 Claims, 14 Drawing Sheets
(1 of 14 Drawing Sheet(s) Filed in Color)

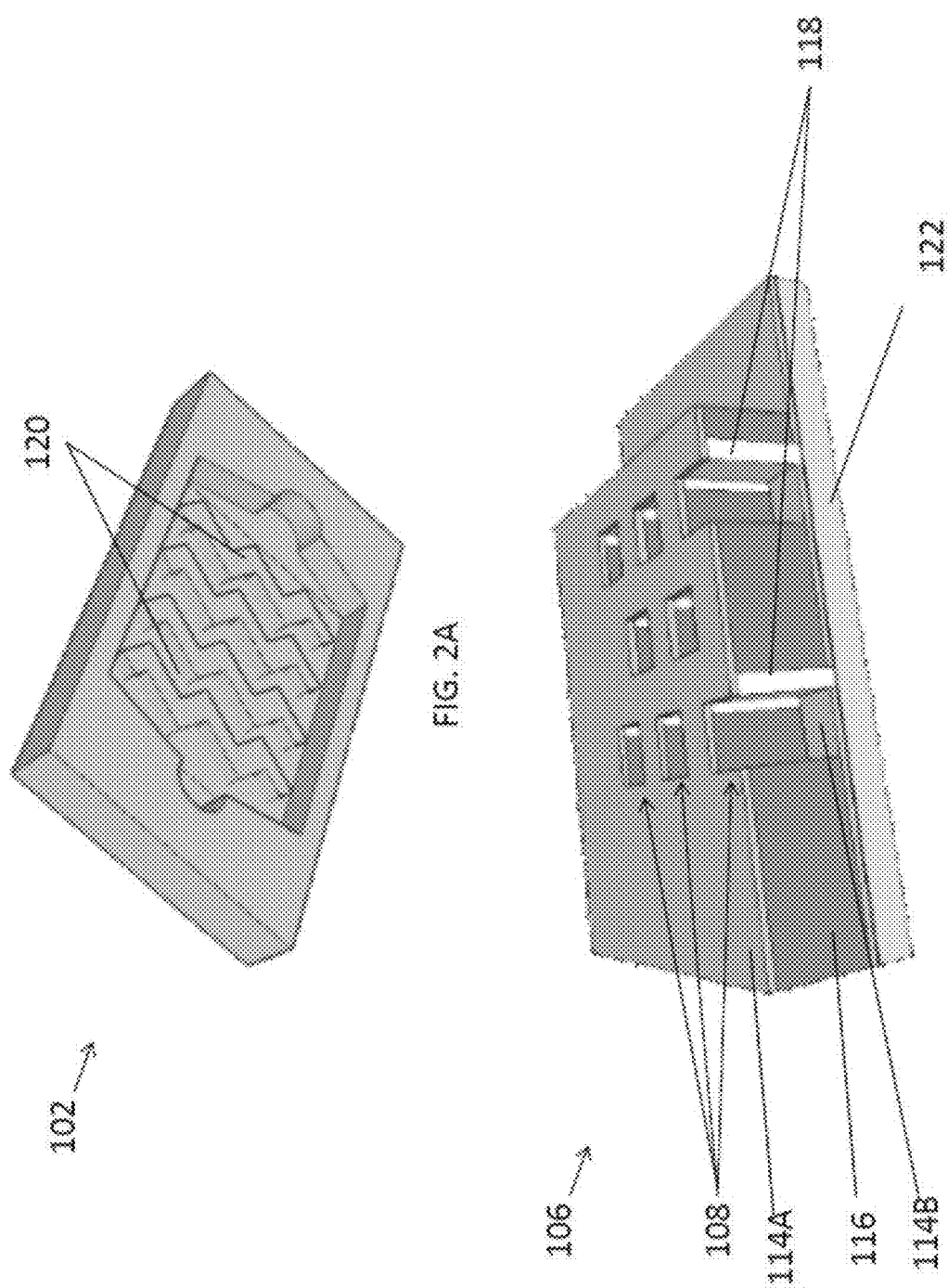

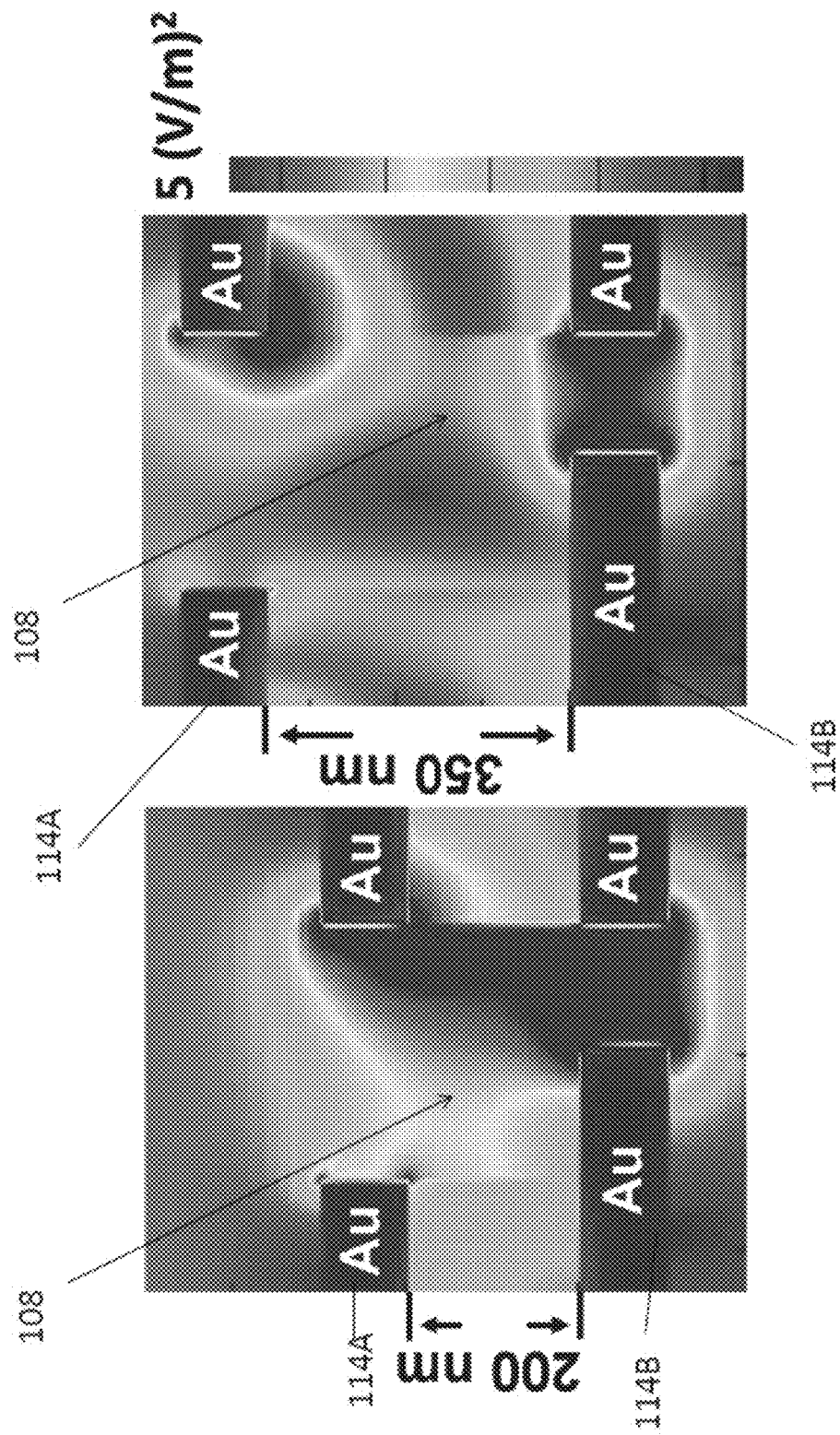

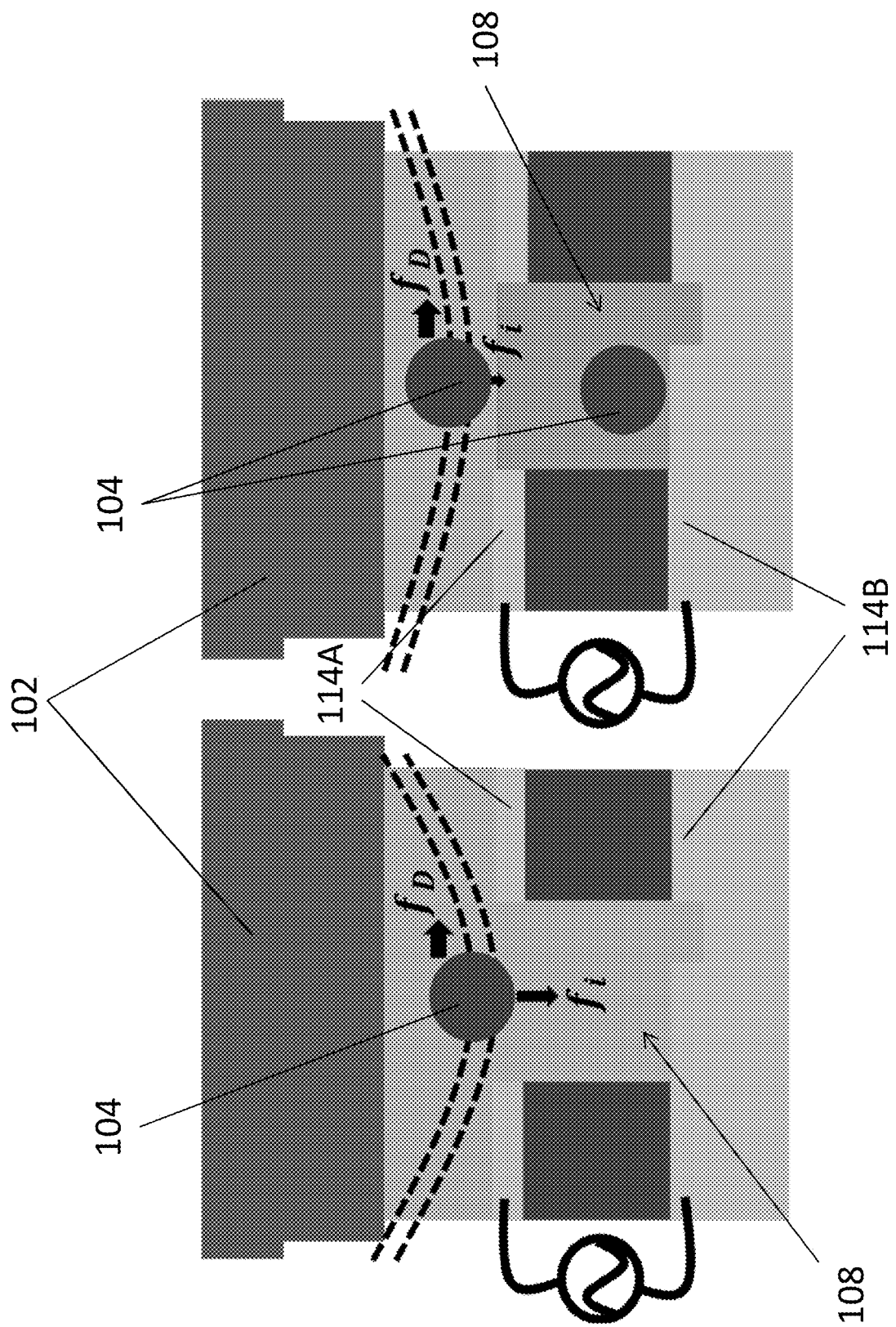

FLUIDIC APPARATUS FOR DETECTION OF A CHEMICAL SUBSTANCE, A BIOSENSOR AND A METHOD OF FABRICATING THE FLUIDIC APPARATUS

TECHNICAL FIELD

The present invention relates to a fluidic apparatus for detection of a chemical substance, a biosensor, and a method of fabricating the fluidic apparatus, although not exclusively, to a biosensor including a microfluidic chip for detection of nanoscale substance in a sample.

BACKGROUND

A disease is any condition that impairs the normal functioning of the body, which can be generally divided into infectious and non-infectious. Importantly, any improper or delay treatment of a disease could lead to a fatal consequence to a patient, regardless of what type of the disease is. Thus, the screening and diagnosis of the disease is of paramount importance.

Traditional screening methods usually include invasive procedures during sampling process. The screening methods are also time-consuming and require tedious instruments installed in laboratories for carrying out the measurements. Although the results generated therefrom may be very accurate and sensitive, such methods may not be suitable for daily applications which require point-of-care and low-cost setup.

SUMMARY OF THE INVENTION

In accordance with a first aspect of the present invention, there is provided a fluidic apparatus for detection of a chemical substance, comprising: a fluidic structure arranged to receive a sample containing a target substance; and a trapping structure in fluid communication with the fluidic structure, and arranged to immobilize the target substance in a detection region; wherein the detection region of the trapping structure is arranged to alter a physical characteristic of an incident light signal which represents a concentration of the target substance contained in the sample.

In an embodiment of the first aspect, the target substance includes a plurality of nanosized units in a sample.

In an embodiment of the first aspect, each of the plurality of nanosized units includes a dimension of below 500 nm.

In an embodiment of the first aspect, each of the plurality of nanosized units includes a dimension of 50-500 nm.

In an embodiment of the first aspect, the target substance includes a plurality of extracellular vesicles in a biological sample.

In an embodiment of the first aspect, the target substance includes a plurality of exosomes.

In an embodiment of the first aspect, the trapping structure comprises a plurality of holes arranged to trap the target substance so as to immobilize the target substance for detection.

In an embodiment of the first aspect, each of the plurality of holes is arranged to trap one or more nanosized units defining a single layer.

In an embodiment of the first aspect, the trapping structure further comprises electrodes arranged to generate an attraction force for attracting the target substance to move towards the plurality of holes in the detection region.

In an embodiment of the first aspect, the attraction force includes dielectrophoresis force.

In an embodiment of the first aspect, the electrodes include a pair of asymmetrical electrodes arranged to generate non-uniform electric field so as to generate the dielectrophoresis force.

In an embodiment of the first aspect, the trapping structure comprises a layer of polymer defined with the plurality of holes, and the layer of polymer is sandwiched by the pair of asymmetrical electrodes.

In an embodiment of the first aspect, the layer of polymer comprises SU-8, TU-7, polymethylmethacrylate, parylene or nanoimprint resist.

In an embodiment of the first aspect, the fluidic structure is defined with a substantially enclosed fluidic cavity when combined with the trapping structure.

In an embodiment of the first aspect, the fluidic structure further comprises an inlet and an outlet in fluid communication with the fluidic cavity.

In an embodiment of the first aspect, the fluidic structure further comprises at least one guiding structure arranged to guide the target substance towards the trapping structure in the detection region.

In an embodiment of the first aspect, the guiding structure is arranged to apply a shear force to the target substance towards the trapping structure so as to immobilize the target substance in the detection region and at the trapping structure.

In an embodiment of the first aspect, the shear force is perpendicular to a primary flow path of the sample in the fluidic cavity.

In an embodiment of the first aspect, the at least one guiding structure includes a plurality of ridges defined in the detection region.

In an embodiment of the first aspect, the plurality of ridges are in a zigzag or other shape.

In an embodiment of the first aspect, the fluidic structure comprises polydimethylsiloxane or biocompatible polymer.

In an embodiment of the first aspect, the physical characteristic includes an optical wavelength of the incident light signal.

In an embodiment of the first aspect, an effective refractive index of the detection region is changed based on an amount of target substance immobilized by the trapping structure.

In accordance with a second aspect of the present invention, there is provided a biosensor comprising: the fluidic apparatus in accordance with the first aspect; a light source arranged to generate the incident light signal; and a spectrometer arranged to a light signal altered by the fluidic apparatus and the target substance in the sample.

In an embodiment of the second aspect, the biosensor further comprises a pump arranged to control a flow of the sample in the fluidic structure.

In accordance with a third aspect of the present invention, there is provided a method of fabricating a fluidic apparatus, comprising the steps of providing a fluidic structure arranged to receive a sample containing a target substance; providing a trapping structure in fluid communication with the fluidic structure, and arranged to immobilize the target substance in a detection region; and combining the fluidic structure with the trapping structure; wherein the detection region of the trapping structure is arranged to alter a physical characteristic of an incident light signal which represents a concentration of the target substance contained in the sample.

In an embodiment of the third aspect, the step of providing a trapping structure comprises the step of defining a plurality of holes on a layer of polymer, wherein the plurality of holes are arranged to trap the target substance so as to immobilize the target substance for detection.

In an embodiment of the third aspect, the plurality of holes are defined by imprinting using an intermediate polymer stamp or by other patterning technology.

In an embodiment of the third aspect, the step of providing a trapping structure further comprises the step of forming a pair of asymmetrical electrodes including a top electrode and a bottom electrode sandwiching the layer of polymer.

In an embodiment of the third aspect, the step of forming a pair of asymmetrical electrodes comprises the steps of: depositing the bottom electrode on a substrate; disposing the layer of polymer defined with the plurality of holes on the bottom electrode; patterning the bottom electrode by etching; forming a sidewall of an insulating material in each of the plurality of holes; and depositing the top electrode on the surface of the layer of polymer opposite to the bottom electrode.

In an embodiment of the third aspect, the top electrode and the bottom electrode are deposited by evaporation.

In an embodiment of the third aspect, the step of forming the sidewall in each of the plurality of holes comprises the step of evaporating the insulating material at a first deposition angle such that insulating material is deposited on a side in each of the plurality of holes to form the sidewall.

In an embodiment of the third aspect, the step of forming a pair of asymmetrical electrodes further comprises the steps of forming an etching mask by evaporating a masking material at a second deposition angle opposite to the first deposition angle.

In an embodiment of the third aspect, the step of providing a fluidic structure comprises the step of fabricating an imprinting stamp which define a fluidic cavity in the fluidic structure.

In an embodiment of the third aspect, the step of providing a fluidic structure further comprises the step of coating the stamp with a polymer and detaching the polymer from the stamp to form the fluidic structure.

In an embodiment of the third aspect, the step of providing a fluidic structure further comprises the step of etching a plurality of grooves on the stamp so as to define a plurality of ridges in the fluidic cavity in the fluidic structure.

In an embodiment of the third aspect, patterns on the stamp are defined by a hybrid nanoimprint and optical lithography process, and an etching process.

In an embodiment of the third aspect, the step of combining the fluidic structure with the trapping structure comprises the steps of treating the fluidic structure using $O_2$ plasma and bonding the fluidic structure to a substrate of the trapping structure.

In an embodiment of the third aspect, the fluidic structure includes polydimethylsiloxane or biocompatible polymer and the substrate of the trapping structure includes a glass or a transparent substrate.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

Embodiments of the present invention will now be described, by way of example, with reference to the accompanying drawings in which:

FIGS. 2A and 2B are perspective view of a fluidic structure and a trapping structure of the fluidic apparatus in FIG. 1;

FIGS. 4A and 4B are color plots showing simulated EM field intensity of example 3D plasmonic nanostructures with two different depth of Au nanohole electrodes;

FIGS. 6A and 6B are illustrations showing effects on an exosome in a primary flow when the hole in a trapping structure is empty or occupied;

DETAILED DESCRIPTION OF THE PREFERRED EMBODIMENT

The inventors have, through their own research, trials and experiments, devised that cancer cells release more exosomes than normal cells and exosomes could be used as biomarkers in cancer diagnostics. However, capturing and detection of exosomes may be difficult because exosomes are small vesicles with typical size range of 30 to 300 nm and they move under Brownian motion in medium.

Preferably, microfluidic systems may be used to manipulate a flow of a fluidic sample containing the exosomes, and by capturing the exosomes in a biosensor, such as a plasmonic biosensor, the amount or concentration of exosomes may be determined, thereby providing useful information for cancer screening.

In one example embodiment, a polydimethylsiloxane (PDMS) microfluidic system with asymmetrical electrodes and nanogrooves may be used to generate dielectrophoresis (DEP) and fluidic force to attract exosomes onto the detection area of three dimensional (3D) plasmonic biosensor without labeling. The 3D plasmonic biosensor may consist of multiple-layer asymmetrical nanostructures to enhance additional plasmon modes and improve the sensitivity for exosome detection. Advantageously, the 3D plasmonic biosensor is not only used for high sensitivity exosome detection but also serves as part of the asymmetrical electrodes, inducing non-uniform electric field gradient to generate DEP force to attract exosomes to the plasmonic biosensor.

Figure 1:
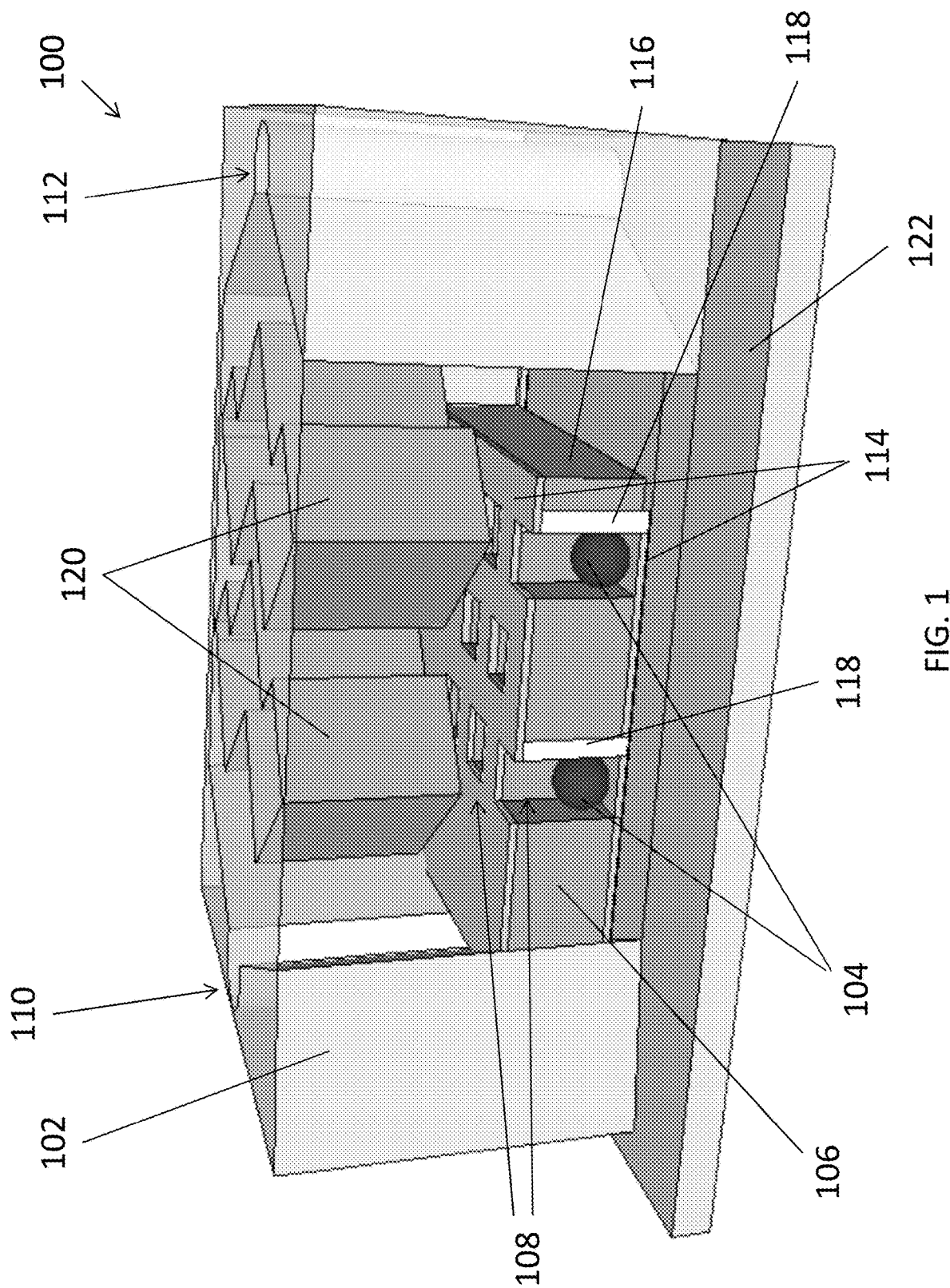
FIG. 1 is a perspective view of a fluidic apparatus in accordance with an embodiment of the present invention.

With reference to FIG. 1, there is shown an embodiment of a fluidic apparatus 100 for detection of a chemical substance, comprising a fluidic structure 102 arranged to receive a sample containing a target substance 104; and a trapping structure 106 in fluid communication with the fluidic structure 102, and arranged to immobilize the target substance 104 in a detection region; wherein the detection region of the trapping structure 106 is arranged to alter a physical characteristic of an incident light signal which represents a concentration of the target substance 104 contained in the sample.

In this embodiment, the fluidic apparatus 100 may receive a fluidic sample containing chemical substance 104, which may be in the form of particles or vesicles suspending in a fluidic medium. These particles 104 may further fall into the traps 108 underneath the mainstream flowing path between the inlet 110 and the outlet 112 of the fluidic structure 102. By trapping or immobilizing the target substance 104 within a detection region, the fluidic structure 102 may be further used as a part of a biosensor which allows a determination of the concentration of the chemical substance in the fluidic sample.

With reference also to FIGS. 2A and 2B, in this embodiment, the fluidic apparatus 100 comprises substantially two main parts, namely a fluidic structure 102 and a trapping structure 106 respectively. Referring to FIG. 2B, the trapping structure 106 comprises a plurality of holes 108 arranged to trap the target substance 104 so as to immobilize the target substance 104 in the detection region for detection.

Preferably, different size and density of the holes 108 may be defined for detection of difference substances. For example, the target substance 104 may include a plurality of nanosized units, each having a dimension of 50-500 nm, in a sample. As discussed earlier, exosomes are small vesicles with typical size range of 30 to 300 nm, which may be trapped or immobilized using the trapping structure 106 with nanoholes 108 each having a dimension of 200-600 nm in diameter. In addition, each of the holes may include a depth of 300-600 nm, which is sufficient to accommodate a whole nanosized unit 104. More preferably, each of the plurality of holes 108 is arranged to trap a single or multiple nanosized unit 104 to further improve the accuracy of measurement. The trapping operation will be discussed later in this disclosure.

Furthermore, the plurality of holes 108 may be defined with a pitch in 400-800 nm, resulting a detection region of 25-100 mm$^2$ in the fluidic structure 102 or the biosensor including such fluidic structure 102. In one example operation, a beam of light may be irradiated through the detection region of the biosensor, the incident light beam is then altered by the target substance 104, such as extracellular vesicles or exosomes in a biological sample, therefore the concentration of the target substance 104 may be determined by measuring the change in the physical characteristic in the light signal.

The trapping structure 106 further comprises electrodes 114 arranged to generate an attraction force for attracting the target substance 104 to move towards the plurality of holes 108 in the detection region. Referring to FIG. 2B, the trapping structure 106 comprises two metal layers sandwiching a layer of polymer 116 which defines the plurality of holes 108 for trapping the target substance 104. Preferably, the two metal layers, forming a top electrode 114A and a bottom electrode 114B are asymmetrical, so as to generate non-uniform electric field to produce the necessary dielectrophoresis (DEP) force for attracting the particles 104 to fall into the holes 108.

Preferably, each of the metal layers includes a pattern different from that of the other electrode in the asymmetrical pair. In this example, the top electrode 114A has the pattern that is substantially matching with the plurality of holes 108 in the trapping structure 106. On the other hand, the bottom electrode 114B has the patterns that substantially cover the bottom of the holes 108, except the footprint of the sidewall structure 118 formed within the holes 108.

The metal layers may include a thickness of 50-100 nm of gold. Alternatively or additionally, other suitable electrode of different thickness, such as Pt, or more complex multilayer metal electrodes such as Ti/Au may be deposited to form the electrodes 114 in the trapping structure 106 according to different requirements or fabrication process. In addition, layer of polymer 116 may comprise SU-8, TU-7, polymethylmethacrylate (PMMA), parylene or nanoimprint resist, having the thickness the same as the depth of the holes 108.

Now referring back to FIG. 1 and FIG. 2A, the fluidic apparatus 100 comprises a fluidic structure 102. The fluidic structure 102 is defined with a substantially enclosed fluidic cavity when combined with the trapping structure 106, such that the sample injected into the fluidic cavity will be "processed" by the trapping structure 106. In addition, the fluidic structure 102 further comprises an inlet and an outlet in fluid communication with the fluidic cavity, for respectively receiving and discharging the sample in the fluidic apparatus 100.

Preferably, when the fluidic structure 102 combines with the trapping structure 106, a fluidic channel is formed between the inlet 110 and the outlet 112. For example, the fluidic channel may define a fluidic path of a height of 300-600 nm within the fluidic cavity, in which the target substance 104 closed to the trapping structure 106 may fall into the plurality of holes 108 and is immobilized. It is also possible that some of the target substances 104 that are not trapped by the trapping structure 106 if the attraction force to the target substance 104 is not sufficient to bring the particles 104 to move out of the main stream or laminar flow of the sample between the inlet 110 and the outlet 112.

Figure 3A:
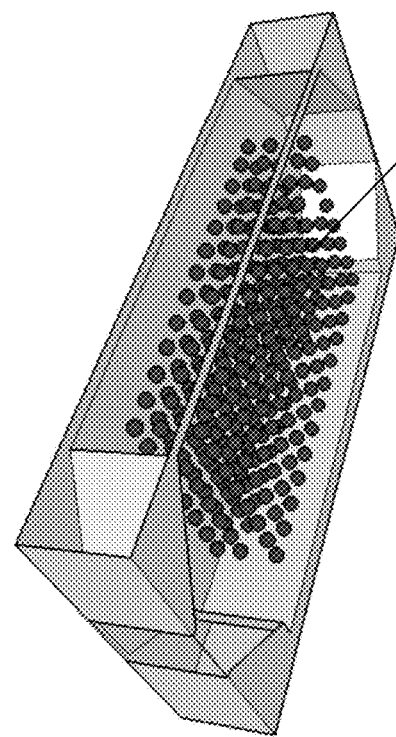
FIGS. 3A to 3C are illustrations showing a distribution of substances in the fluidic structure of FIG. 2A with different guiding structures defined in the fluidic cavity.
Figure 3C:
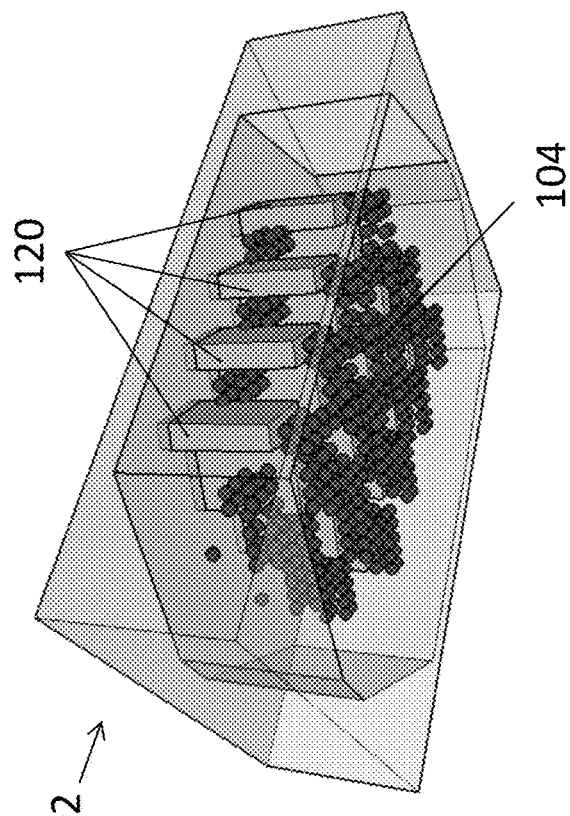
Figure 3B:
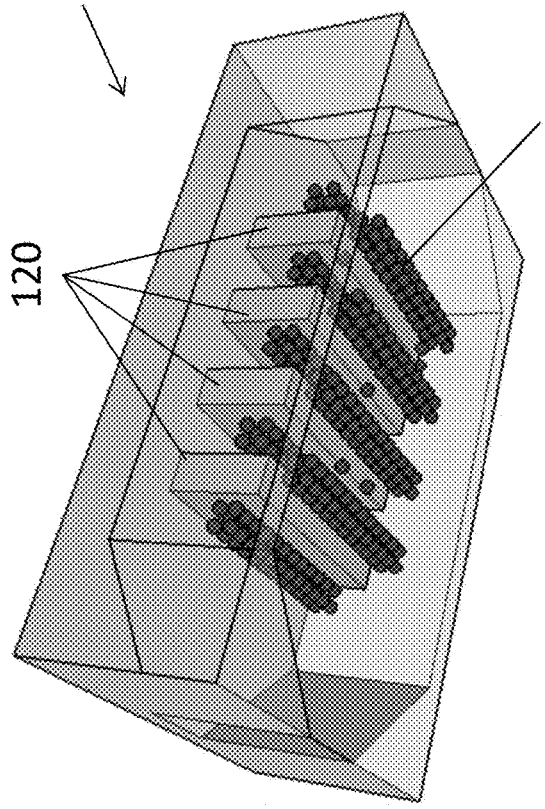

In addition, the fluidic structure 102 further comprises at least one guiding structure 120 arranged to guide the target substance 104 towards the trapping structure 106 in the detection region. With reference also to FIGS. 3A to 3C, three different example guiding structures 108 are illustrated, namely a flat internal surface with no ridges, multiple stripes or ridges formed on the internal surface of the fluidic cavity and multiple zigzag-shaped ridges on top of fluidic channel respectively.

Preferably, when strips or ridges 108 are formed above the channels, the inertia lift force near the nanogrooves overhang will change the exosome flow path and push them towards the bottom of the fluidic channel, thus moving the target substance 104 closer to the surface of the trapping structure 106. In addition, the guiding structure may apply a shear force to the target substance 104 towards the trapping structure 106, which further forces the target substance 104 to enter the traps 108.

In addition, the pattern of nanogroove arrays or the zigzag nanogratings 108 may force more exosomes onto the plasmonic sensor area compared to flat surface or stripe nanogratings due to a larger effective area, as illustrated in FIGS. 3A to 3C. This shear force from the flow is perpendicular to the primary flow path and provides an additional external force to get the exosomes onto the plasmonic sensor surface. When zigzag nanogratings 108 are used on the top surface of the channel, a higher density of exosomes will be pushed towards the trapping structure 106 of the plasmonic sensor as the zigzag patterns cover a large sensor area, or substantially the detection region, such that the target substance 104 or the exosomes are immobilized in the detection region.

Preferably, the nanogrooves or the ridges 108 may be defined with 600-1000 nm width, 1000-1800 nm pitch and 300-600 nm height. In addition, the optional zigzag pattern may be includes an angle of 120° between each pair of zigzag segments. The fluidic structure 102 may be fabricated using polydimethylsiloxane (PDMS) or biocompatible polymer and these nanopatterns may be defined on the PDMS layer using nanoimprint technology or other patterning technology.

The inventors devise that nanoimprint is a high throughput and low cost technology for fabricating 3D nanostructures with high uniformity over a large area. Therefore, it is suitable technology for producing biosensors with 3D nanostructures compared to other techniques. The cost of the equipment for nanoimprint is usually more than 10 times lower than systems for focus ion beam or electron beam lithography and the throughput is few orders of magnitude faster. In addition, while NIL can produce 3D nanostructures by stacking multiple layers together, other technique will be much more complicated to produce 3D devices.

Alternatively, other fabrication technology such as focused ion beam, electron beam lithography, and/or atomic force microscopy can also be used to fabricate nano-size patterns. However, all the other techniques will take much longer time (days) to fabricate nanostructures over much smaller area (e.g. 1 $cm^2$). On the other hand, nanoimprint lithography (MIL) may only need a few minutes to fabricate 3D nanostructures over a large area (e.g. 170 $cm^2$). More details of the fabrication process will be discussed later.

Preferably, the exosomes 104 follow laminar streamline in the medium and can be controlled by both the physical force generated by the nanogrooves 120 on top of the fluidic channel and DEP force generated by the non-uniform electric field. With reference to FIGS. 4A and 4B, there is shown simulated EM field intensity of 3D plasmonic nanostructures with two different depth (200 nm and 350 nm) of Au nanohole electrodes, top Au nanohole has 300 nm width, 535 nm pitch, and bottom Au nanohole has 120 nm width, Au thickness is 100 nm, obtained using FDTD simulation tool.

Figure 5B:
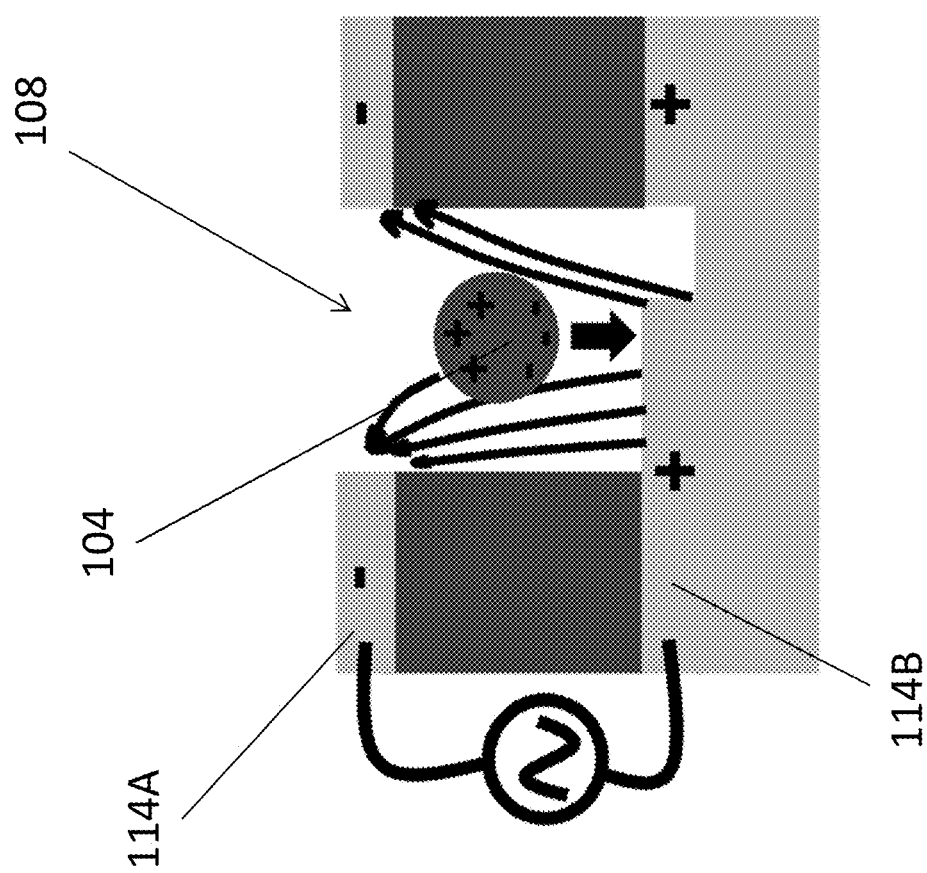
FIGS. 5A and 5B are illustrations showing effects on an exosome when subjected to uniform and non-uniform electric field in the trapping structure of FIG. 2B.
Figure 5A:
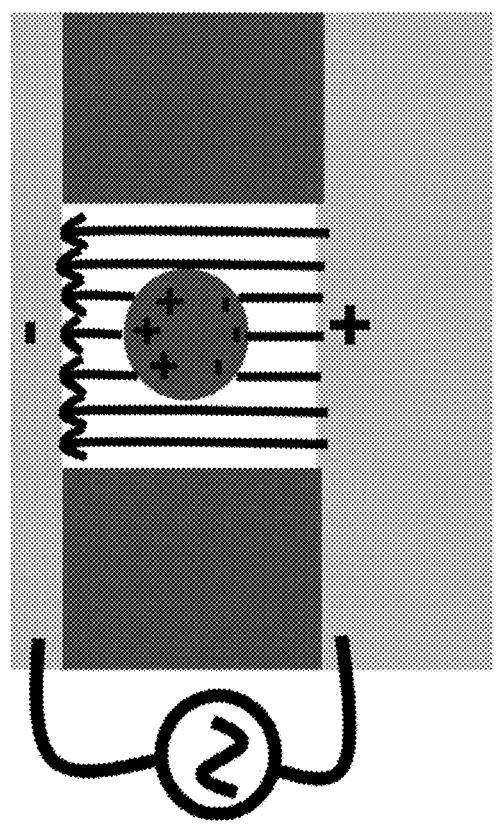

Further referring to FIGS. 5A and 5B, the effects of electric field on a single particle 104 are explained. Referring to FIG. 5A, no DEP force is generated for uniform electric field with symmetrical electrodes on top and bottom layers. On the other hand, referring to FIG. 5B, for non-uniform electric field provided by asymmetrical top and bottom electrodes, a negative DEP force may be generated to push the exosome 104 onto the bottom of the hole 108, so as to capture the particle 104 in the hole 108 and therefore the plasmonic sensing area for detection.

In addition, the trapping of the particles 104 are further assisted by the shear force generated due to the existence of the nanostructures or the ridges 120 in the fluidic cavity. With reference to FIGS. 6A and 6B, there is shown an illustration of exosomes streamline before and after being trapped in nanoholes 108, where $f_D$ is stokes's drag force and $f_i$ is inertial lift force. The medium flow rate and nanogroove arrays 120 on top of microfluidic channel may be optimized to control the shear force and keep the exosomes trapped in the SU-8 nanoholes. Once a single exosome is trapped in the hole, the inertial lift force for second exosome on top of the first one would be reduced which allowed second exosome to follow the primary flow path and not be trapped in on top of another exosome. Therefore, each of the plurality of holes 108 may only trap a single layer of nanosized unit, or only a single nanosized unit in a respective hole 108.

Figure 7:
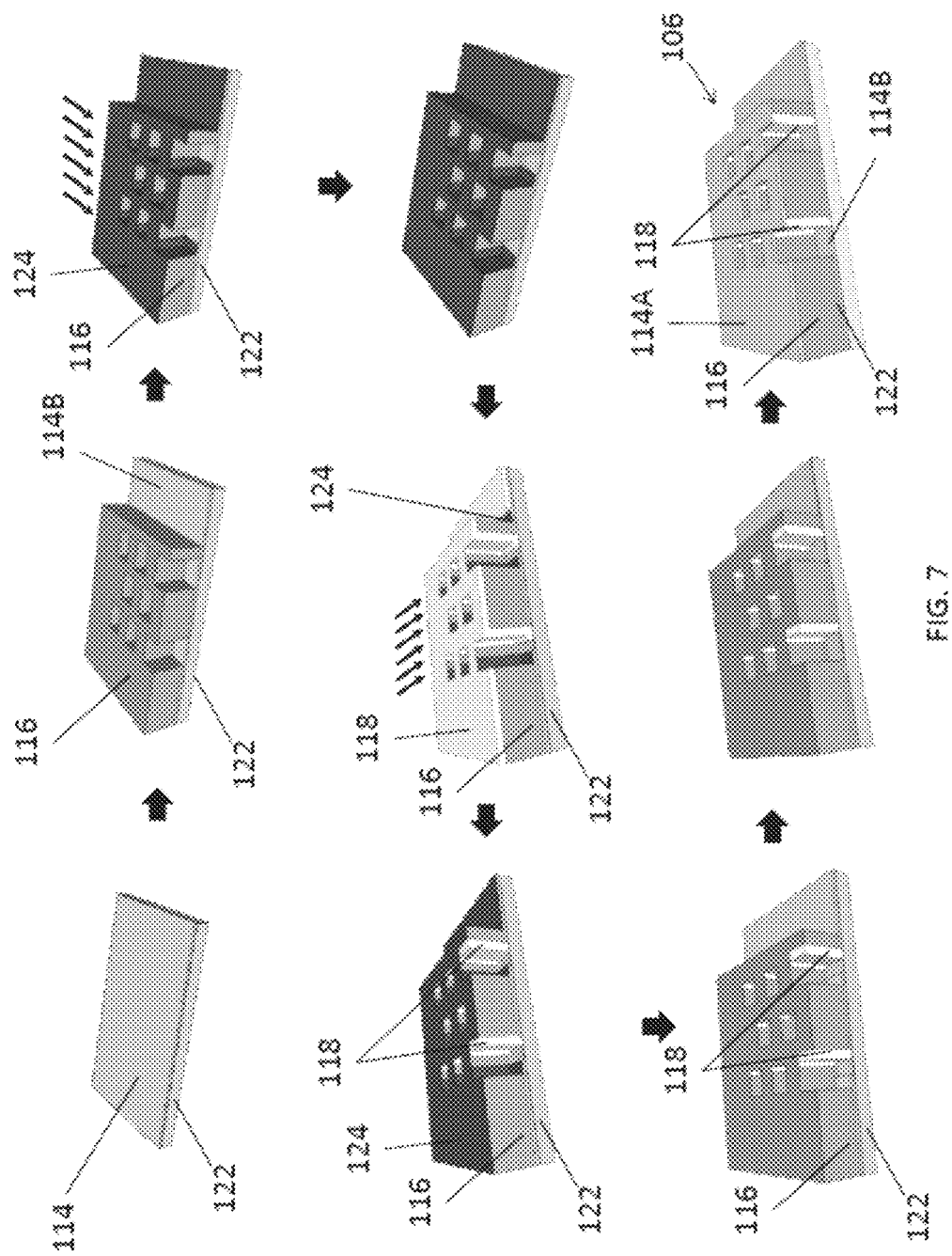
FIG. 7 is an example process flow of fabricating the trapping structure of FIG. 2B.

With reference to FIG. 7, there is shown an example method of fabricating the trapping structure 106. The fabrication process starts with preparing a glass substrate 122. For example, a glass substrate 122 (12×20 $mm^2$) may be first cleaned by piranha solution (3:1 $H_2SO_4:H_2O_2$), acetone, isopropanol, and deionized water for 20 min. Subsequently, the glass substrate 122 may be further pretreated by $O_2$ plasma to further remove organic residuals and enhance adhesion between the glass and metal film. Then, the bottom electrode 114B, such as Ti/Au, may be deposited, such as using evaporation, on the substrate 122.

A layer of polymer defined with the plurality of holes 108 may be disposed on the bottom electrode layer 114B. For example, a layer of SU-8 resist may be first coated on the bottom electrode 114B, followed by imprinting using a thermal and ultraviolet (UV) process at ° C., 30 bar, and 365 nm UV exposure for 60 s. The plurality of holes may be defined by imprinting using an intermediate polymer stamp (IPS), which is a soft transparent polymer to be patterned with nanopillar structures. The substrate 122 may also be treated with trichloro(1H, 1H, 2H, 2H-perfluorooctyl)silane to help demolding. The SU-8 resist may be diluted by anisole solution to control the thickness of SU-8 film.

Figure 8:
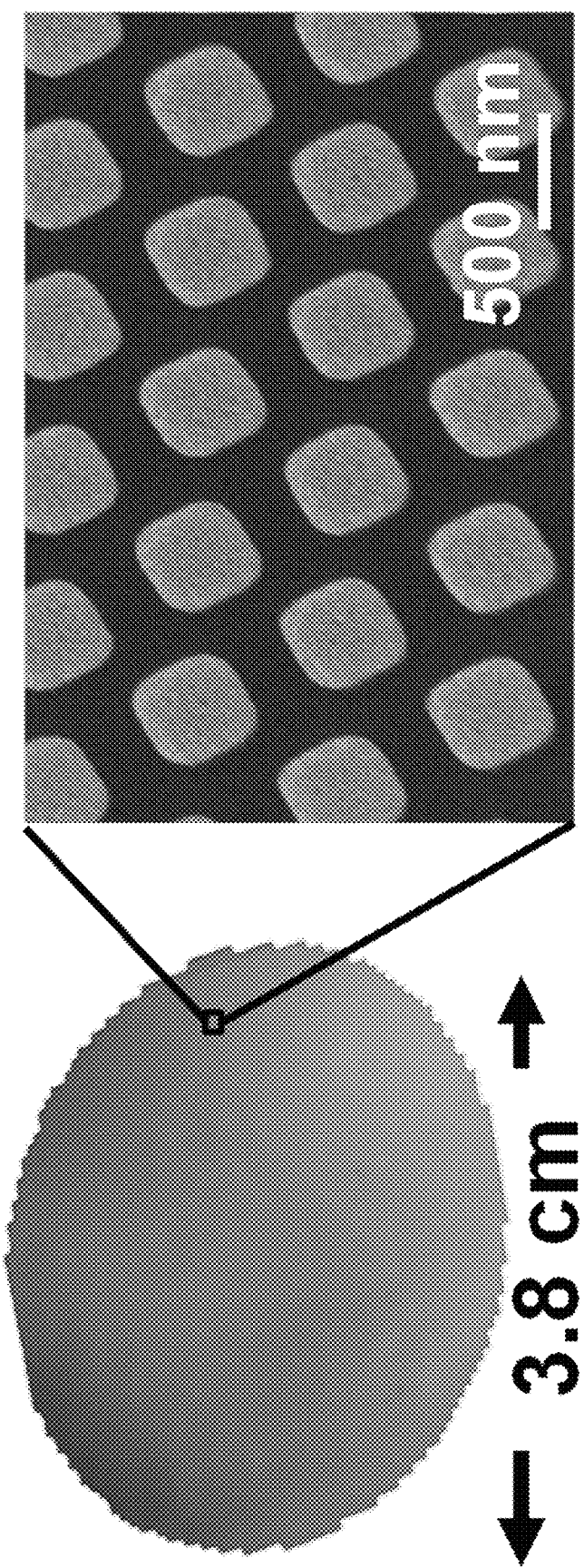
FIG. 8 are micrographs showing the patterns on an intermediate polymer stamp for use in the fabricating the trapping structure of FIG. 2B.

With reference also to FIG. 8, there is shown a micrograph of the IPS stamp used in the NIL process. In this example, the size of the IPS stamp was 3.8 cm in diameter and the nanopillars were 280 nm width and 535 nm pitch with high uniformity.

Alternatively, the SU-8 layer 116 may be patterned using other methods. For example, a layer of SU-8 or such a layer of other alternative material may be patterned and transferred to the substrate 122 using a reversal imprinting process, in which the polymer layer may be coated on a stamp with the nanopillars to form the holes, and then the entire layer of polymer may be transferred to the substrate 122 followed by detaching the stamp to leave the polymer layer on the substrate 122. Yet alternatively, methods such as photolithography and chemical etching process may be use instead.

After the demolding process, an etching mask, such a chromium mask layer 124 may be deposited onto the SU-8 polymer layer 116. Preferably, the masking material including chromium may be evaporated at a predetermined angle such that, not only the top surface of the SU-8 layer, but also one of the side of each of the holes 108 defined in the polymer layer 116 is coated and protected by the etching mask 124. Then the bottom electrode may be patterned by etching away the exposing area not covered by the chromium mask 124.

Then, a layer of insulating material 118, such as $SiO_2$, may be deposited (e.g. by evaporation) at another deposition angle to form a sidewall 118 in each of the plurality of holes 108. Preferably, the deposition angles used in the chromium mask evaporation step and the $SiO_2$ evaporation step may be opposite to each other, such that the sidewall 118 is formed in the holes 108 opposite to the side where the chromium mask 124 is deposited.

Subsequently, the $SiO_2$ film may be dry etched directionally by reactive ion etching (RIE) such that only the $SiO_2$ spacer 118 on the sidewall in each of the holes 108 is remained. Then the chromium mask 124 may be stripped by etching.

Alternatively, the etching mask and the insulating sidewall may be of other materials. For example, the etching mask may include other metals or metal oxides, such as titanium or aluminum, which may be suitable for masking a subsequent etching process of other insulating material such as polymer or other metal oxide.

Optionally, an additional step of etching of the Au electrode at the bottom of each of the holes may be included to ensures residual patterns of Au not being covered by the polymer is removed. Finally, another layer of metal, which forms the top electrode 114A, may be deposited on the surface of the SU-8 polymer layer. For example, by depositing Au in a normal direction to the substrate 122, the top electrode layer 114A will be defined with holes and the exposed bottom in the holes will be filled again, thus forming the asymmetrical electrodes and plasmonic biosensors.

Figure 9:
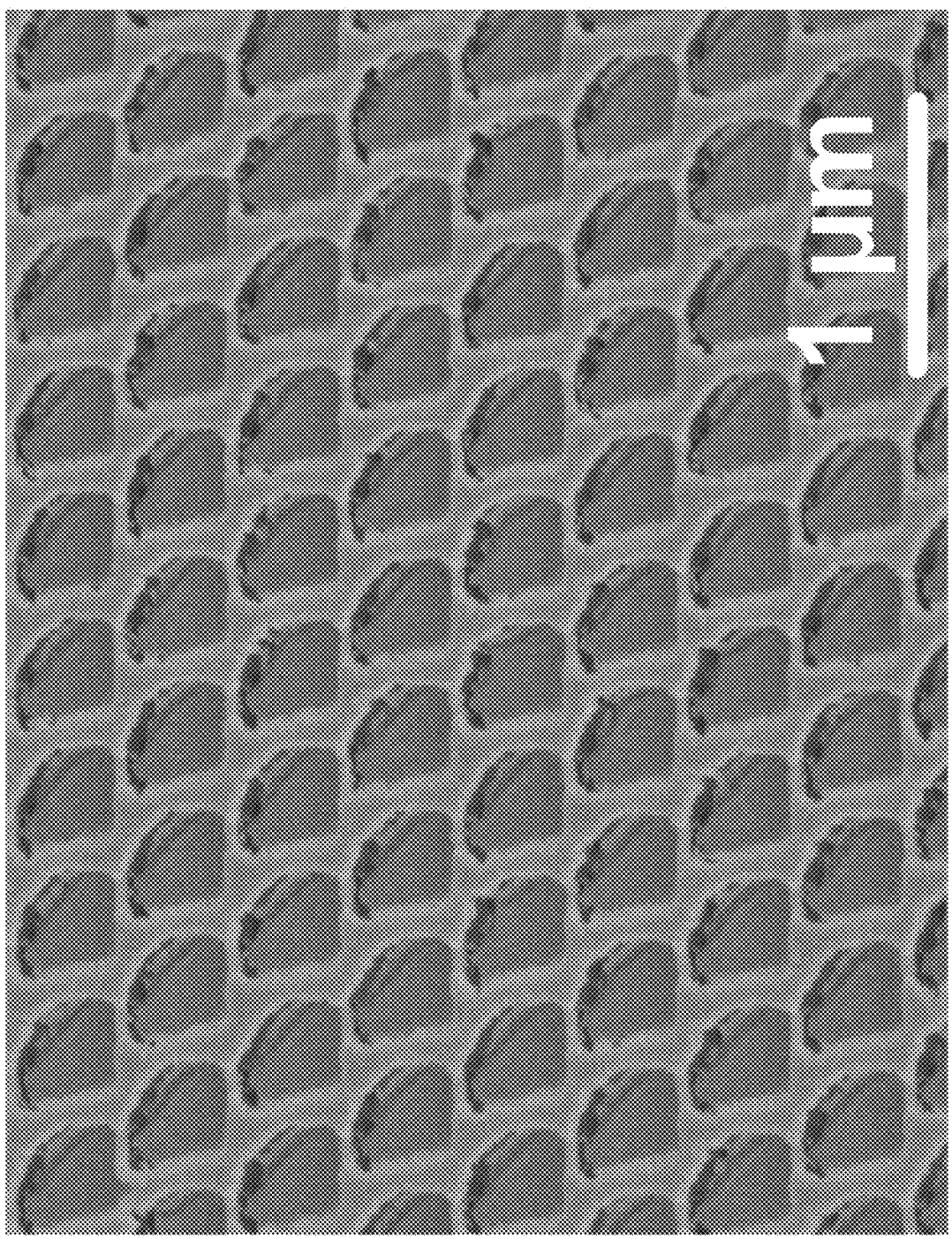
FIG. 9 is a micrograph showing a top view of the trapping structure of FIG. 2B in the detection region.

With reference to FIG. 9, there is shown a micrograph of a fabricated trapping structure 106 including asymmetrical 3D plasmonic nanostructure. It is observable the nanostructures are defined with high uniformity matching with the structures on the IPS stamp of FIG. 8.

Figure 10:
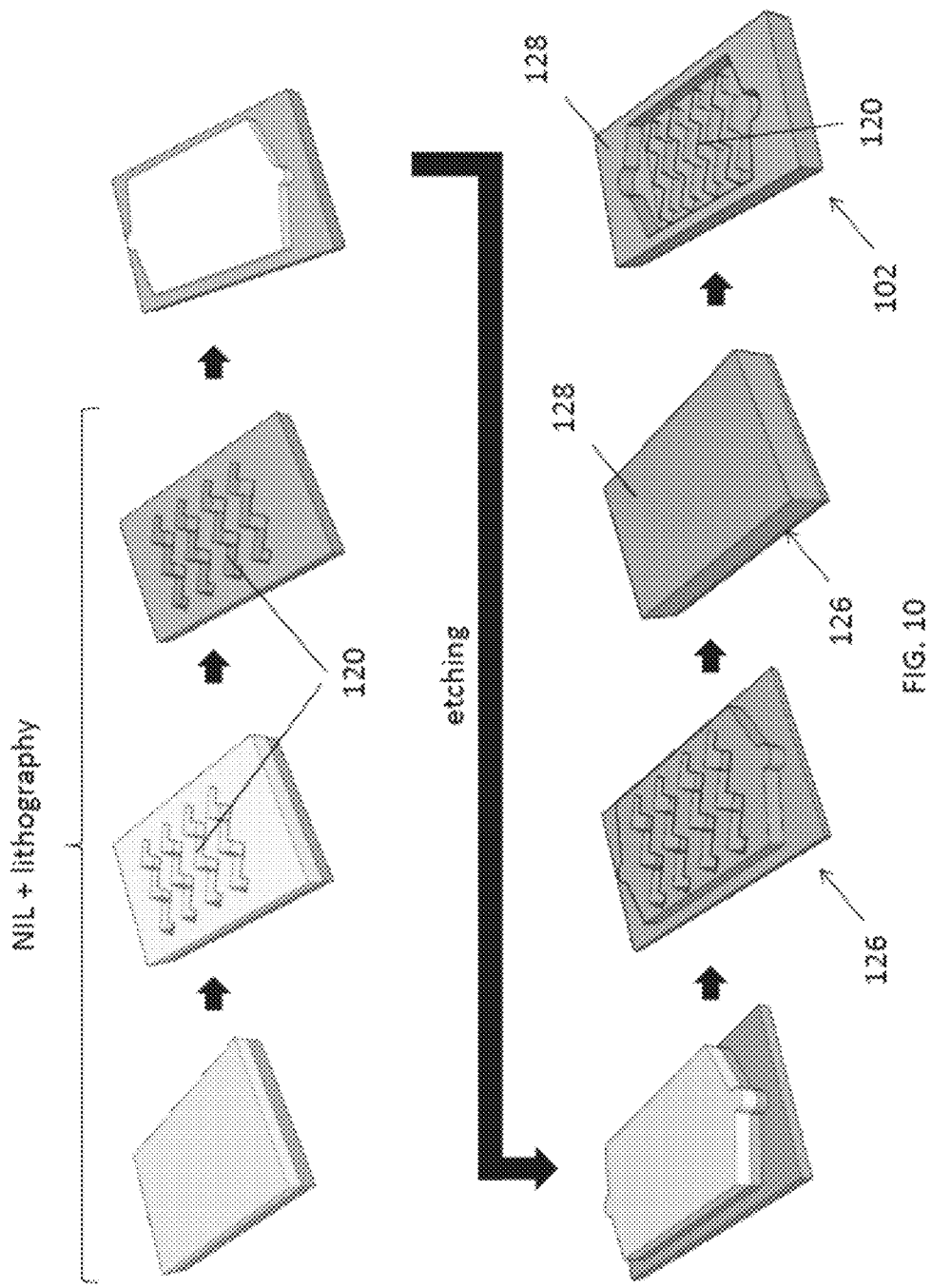
FIG. 10 is an example process flow of fabricating the fluidic structure of FIG. 2A.

With reference to FIG. 10, there is shown an example method of fabricating the fluidic structure 102 that defines the fluidic cavity and the plurality of guiding structures 120 in the cavity. The process starts with preparing a stamp 126 for molding the fluidic structure 102. Preferably, the imprinting stamp 126 defines the fluidic cavity in the fluidic structure 102.

Preferably, a Si stamp 126 with fluidic channel and nanogroove arrays 120 may be first patterned by hybrid nanoimprint and optical lithography, and then an etching process such as using deep RIE to form the necessary nanogroove patterns 120 thereon. The overall shape of the fluidic cavity, and the inlet/outlet ports are then defined on the Si stamp 126 using a second lithography and etching step.

Alternatively, the stamp 126 may be fabricated using other rigid materials such as polymer, quartz or metal.

Once the imprinting stamp 126 is ready, a polymer 128, such as PDMS, may be coated on the stamp. After curing (e.g. at 80° C.), the fluidic structure 102 may be detached from the stamp to form the fluidic structure 102. In this example, the grooves 120 that are defined on the stamp 126 by etching defines the ridges 120 in the fluidic cavity in the fluidic structure 102, therefore, the depth of the grooves are substantially the height of the ridges 126 or strips. Preferably, the dimensions of nanogrooves may be engineered to maximize the force to push exosomes onto the detection area of the 3D plasmonic nanoholes.

Figure 11:
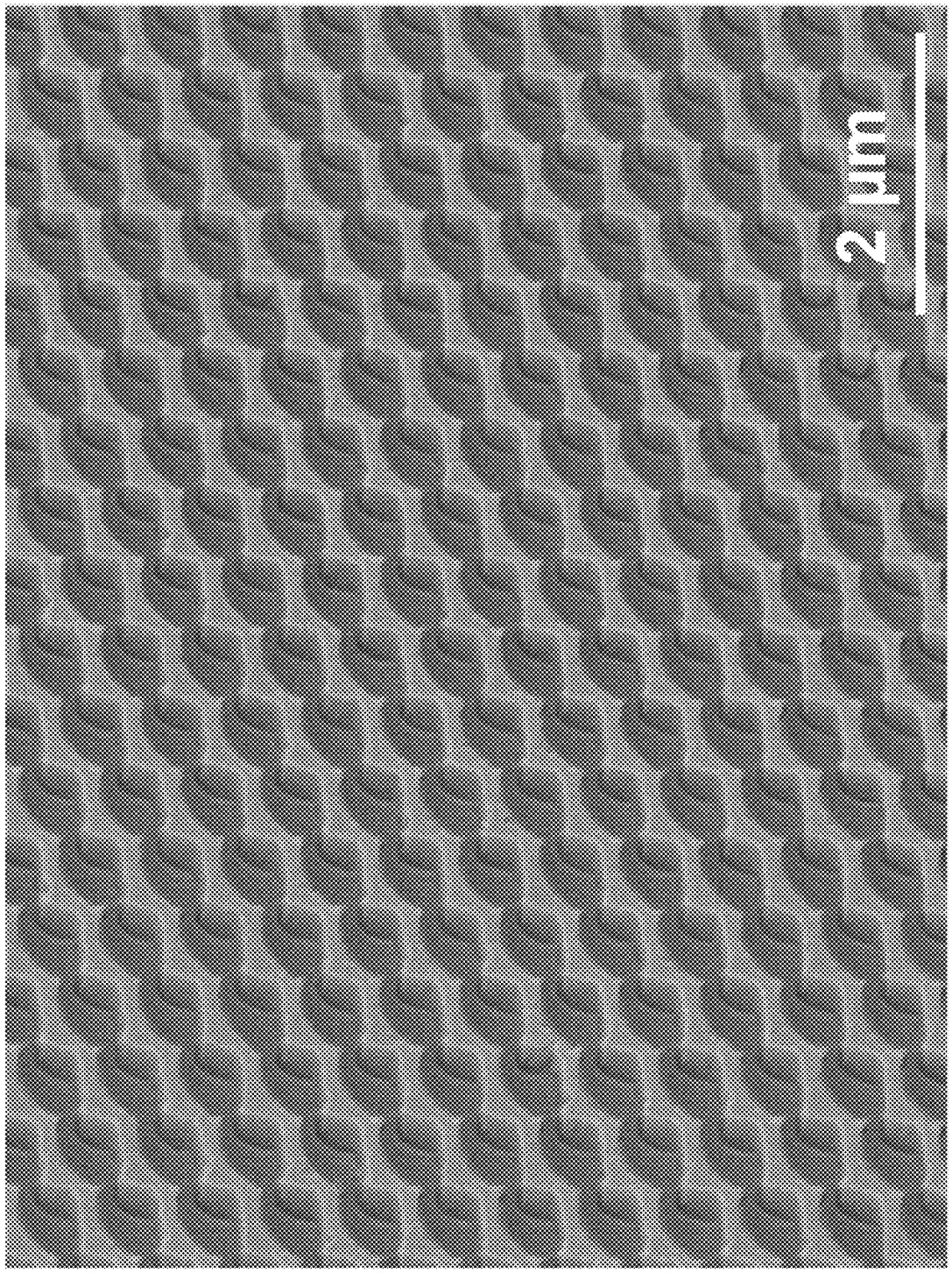
FIG. 11 is a micrograph showing a top view of the zigzag-shape guiding structure in the fluidic structure of FIG. 2A in the detection region.

With reference to FIG. 11, there is shown a micrograph of zigzag pattern on top of microfluidic channel defined on the PDMS fluidic structure 102. It is observable that the pattern is of high uniformity across different areas of the structure.

When both the fluidic structure 102 and the trapping structure 106 are fabricated, the two may be combined to a substantially enclosed structure. Preferably, the fluidic structure 102 may be treated using $O_2$ plasma, which generates —OH groups on the surface of PDMS. This provides covalent bonds for PDMS to be bonded to the glass substrate 122 of the trapping structure 106, so as to combine the two structures together.

Figure 12:
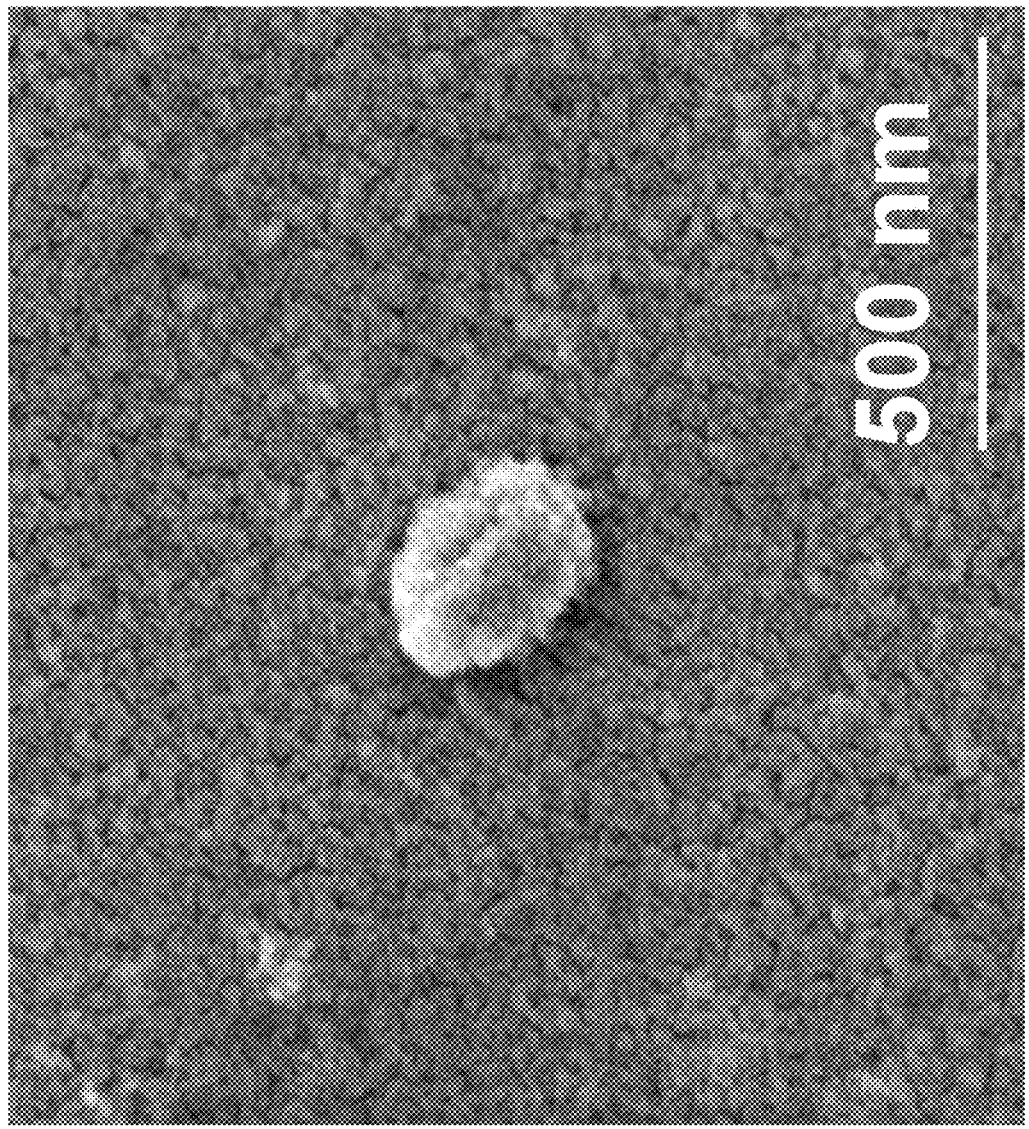
FIG. 12 is a micrograph showing an exosome on a surface of gold metal.

Upon combining the two structures, the guiding structures 120 on the fluidic structure 102 aligns with the plurality of holes 108 on the trapping structure 106 to ensures that the guiding structure may facilitate forcing the target substance 104 fall into the holes in the detection area for subsequent detection. FIG. 12 shows an example of an exosome being attracted on a surface of the bottom gold electrode, which has a size of about 250 nm.

Figure 13:
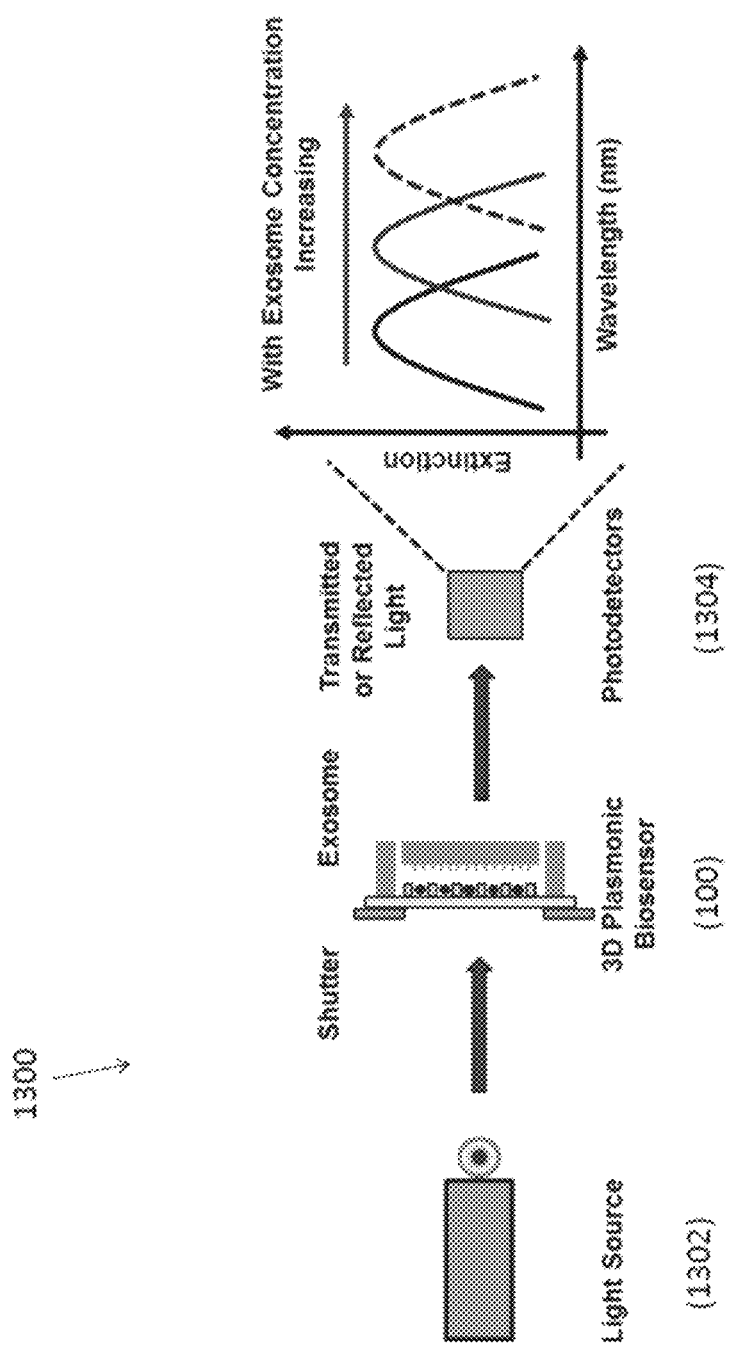
FIG. 13 is an example biosensor apparatus including the fluidic apparatus of FIG. 1 in accordance with an embodiment of the present invention.

With reference to FIG. 13, there is shown an embodiment of a biosensor 1300, comprising the aforementioned fluidic apparatus 100, a light source 1302 and a spectrometer 1304. In addition, the biosensor apparatus may also include a pump (not shown) for controlling a flow rate of the sample in the fluidic structure 102.

In this example, a biosensor 1300 may be operated as follows: firstly, injecting the fluidic sample into the fluidic cavity with a flow rate of 0.5 ml/min through the inlet of the fluidic structure 102; at the same time, an AC electric bias of 5 $V_{pp}$ at 20 kHz may be applied across the top and bottom electrodes on the trapping structure 106 to generate the required DEP forces. With these parameters, the exosome trapping durations will be about $1 \times 10^6$-$1 \times 10^9$ particles/ml. After a predetermined period of time, the preparation of the plasmonic biosensor is completed and ready for optical measurement.

Preferably, the altered physical characteristic includes an optical wavelength of the incident light signal. Thus, a single-wavelength or monochrome light source may be preferable. Alternatively, a broadband light source with suitable wavelength selector or filter may be used as the light source.

The 3D plasmonic biosensor or the fluidic apparatus 100 trapping with the exosomes may generate an extinction peak and this peak is highly sensitive to the changes of effective refractive index (RI) in the surrounding area of the plasmonic biosensor. When exosome is located on the surface of plasmonic sensing area, the effective RI increased and the extinction peak is red shifted. With increased exosome concentration, the peak further red shifted.

Figure 14:
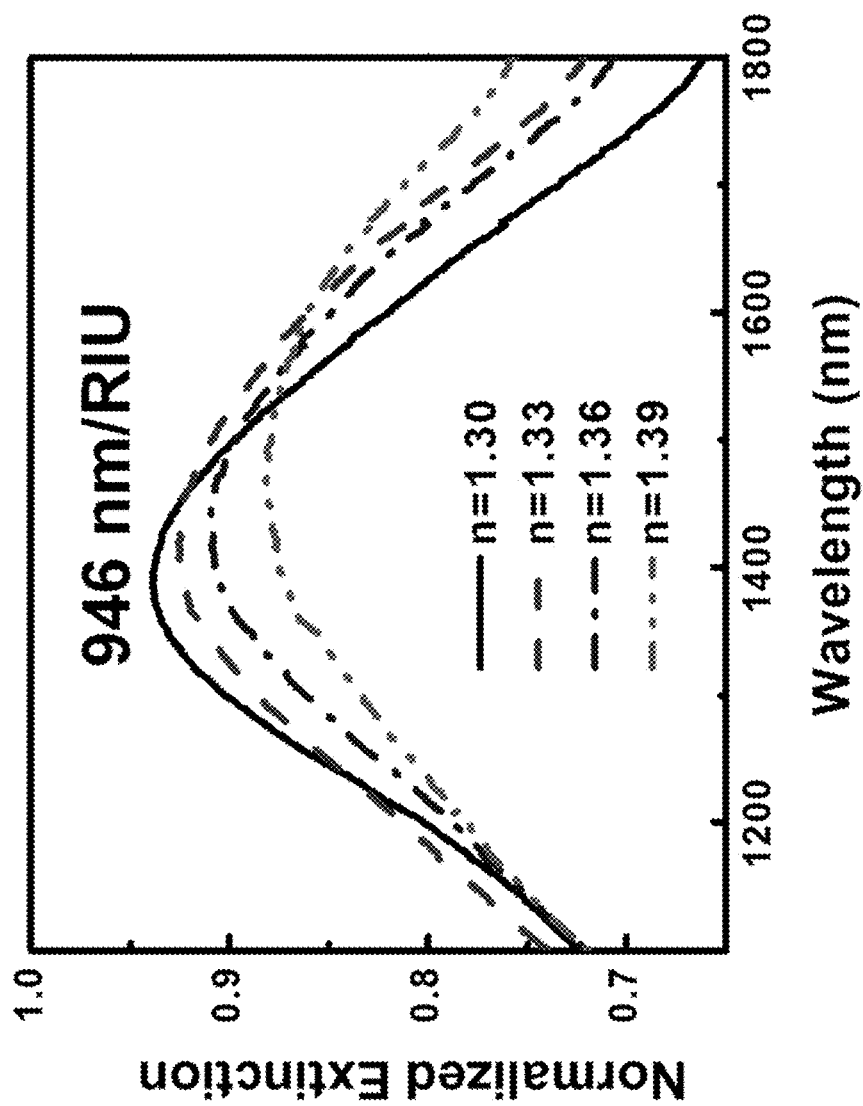
FIG. 14 is a plot showing experimental results of measurement of concentrations of target substance in a sample using the biosensor of FIG. 13.

The altered light signal may be further detected by using photomultiplier tube and lead sulphide photodetectors in an ultraviolet-visible-near-infrared photospectrometer to pick up the transmitted or reflected light signal with wavelength at a range of 400-2400 nm. With reference to FIG. 14, example measurement results of different extinction obtained based on the change of solutions with different RI are illustrated.

These embodiments may be advantageous in that the microfluidic chip integrated with 3D plasmonic biosensor can be used to capture and detect exosomes in medium without labeling. The sample volume could be reduced to μl by using microfluidic channel. Exosomes follow the laminar flow in the medium and will be forced to the 3D plasmonic biosensing area by shear and DEP force.

Advantageously, exosomes of nanoscale dimension may be captured and detected without antibody labeling using the fluidic apparatus, which requires only low sample volume consumption due to advantage of microfluidic chip. In addition, the biosensor is suitable for exosome detection in a large concentration range including very low concentration because of the high sensitivity of 3D plasmonic biosensor.

The fluidic apparatus and the biosensor may be useful for clinical application such as early stage cancer detection and diagnostic. Instead of detecting circulating cancer cells which are rarely observed in patients, cancer cell derived exosomes are more accessible and useful to investigate cancer cell metastases and proliferation.

It will be appreciated by persons skilled in the art that numerous variations and/or modifications may be made to the invention as shown in the specific embodiments without departing from the spirit or scope of the invention as broadly described. The present embodiments are, therefore, to be considered in all respects as illustrative and not restrictive.

Any reference to prior art contained herein is not to be taken as an admission that the information is common general knowledge, unless otherwise indicated.

The invention claimed is:

1. A fluidic apparatus for detection of a chemical substance, comprising:
a fluidic structure arranged to receive a sample containing a target substance, wherein the target substance includes a plurality of nanosized units in a sample and each of the plurality of nanosized units have a dimension of between 50 and 500 nm; and
a trapping structure in fluid communication with the fluidic structure and arranged to immobilize the target substance in a detection region; wherein the detection region of the trapping structure is arranged to alter a physical characteristic of an incident light signal which represents a concentration of the target substance contained in the sample; wherein the trapping structure comprises a plurality of holes arranged to trap the target substance so as to immobilize the target substance for detection, and wherein the plurality of holes are adapted to trap the target substance as it falls into the holes underneath a primary flow path; the trapping structure further comprising electrodes arranged to generate an attraction force for attracting the target substance to move towards the plurality of holes in the detection region.

2. The fluidic apparatus in accordance with claim 1, wherein the target substance includes a plurality of extracellular vesicles in a biological sample.

3. The fluidic apparatus in accordance with claim 2, wherein the target substance includes a plurality of exosomes.

4. The fluidic apparatus in accordance with claim 1, wherein each of the plurality of holes is arranged to trap a single layer of nanosized unit.

5. The fluidic apparatus in accordance with claim 1, wherein the attraction force includes dielectrophoresis force.

6. The fluidic apparatus in accordance with claim 5, wherein the electrodes include a pair of asymmetrical electrodes arranged to generate non-uniform electric field so as to generate the dielectrophoresis force.

7. The fluidic apparatus in accordance with claim 6, wherein the trapping structure comprises a layer of polymer defined with the plurality of holes, and the layer of polymer is sandwiched by the pair of asymmetrical electrodes.

8. The fluidic apparatus in accordance with claim 7, wherein the layer of polymer comprises SU-8, TU-7, polymethylmethacrylate, parylene or nanoimprint resist.

9. A fluidic apparatus for detection of a chemical substance, comprising:
a fluidic structure arranged to receive a sample containing a target substance, wherein the target substance includes a plurality of nanosized units in a sample and each of the plurality of nanosized units have a dimension of between 50 and 500 nm; and
a trapping structure in fluid communication with the fluidic structure and arranged to immobilize the target substance in a detection region; wherein the detection region of the trapping structure is arranged to alter a physical characteristic of an incident light signal which represents a concentration of the target substance contained in the sample, wherein the fluidic structure is defined with a substantially enclosed fluidic cavity when combined with the trapping structure, and wherein the fluidic cavity comprises nanogroove arrays with a pattern;
wherein the fluidic structure further comprises at least one guiding structure arranged to guide the target substance towards the trapping structure in the detection region.

10. The fluidic apparatus in accordance with claim 9, wherein the fluidic structure further comprises an inlet and an outlet in fluid communication with the fluidic cavity.

11. The fluidic apparatus in accordance with claim 9, wherein the guiding structure is arranged to apply a shear force to the target substance towards the trapping structure so as to immobilize the target substance in the detection region and at the trapping structure.

12. The fluidic apparatus in accordance with claim 11, wherein the shear force is perpendicular to a primary flow path of the sample in the fluidic cavity.

13. The fluidic apparatus in accordance with claim 9, wherein the at least one guiding structure includes a plurality of ridges defined in the detection region.

14. The fluidic apparatus in accordance with claim 13, wherein the plurality of ridges are in a zigzag shape.

15. A method of fabricating a fluidic apparatus, comprising the steps of:
providing a fluidic structure arranged to receive a sample containing a target substance;
providing a trapping structure in fluid communication with the fluidic structure, and arranged to immobilize the target substance in a detection region, wherein the target substance includes a plurality of nanosized units in a sample and each of the plurality of nanosized units have a dimension of between 50 and 500 nm; and
combining the fluidic structure with the trapping structure; wherein the detection region of the trapping structure is arranged to alter a physical characteristic of an incident light signal which represents a concentration of the target substance contained in the sample, wherein the step of providing a trapping structure comprises the step of defining a plurality of holes on a layer of polymer, wherein the plurality of holes are arranged to trap the target substance as it falls into the holes underneath a primary flow path, so as to immobilize the target substance for detection; the plurality of holes being defined by imprinting using an intermediate polymer stamp.

16. A method of fabricating a fluidic apparatus, comprising the steps of:
providing a fluidic structure arranged to receive a sample containing a target sub stance;
providing a trapping structure in fluid communication with the fluidic structure, and arranged to immobilize the target substance in a detection region, wherein the target substance includes a plurality of nanosized units in a sample and each of the plurality of nanosized units have a dimension of between 50 and 500 nm; and
combining the fluidic structure with the trapping structure; wherein the detection region of the trapping structure is arranged to alter a physical characteristic of an incident light signal which represents a concentration of the target substance contained in the sample; wherein the step of providing a trapping structure further comprises the step of forming a pair of asymmetrical electrodes including a top electrode and a bottom electrode sandwiching a layer of polymer.

17. The method of fabricating a fluidic apparatus in accordance with claim 16, wherein the step of forming a pair of asymmetrical electrodes comprises the steps of:

depositing the bottom electrode on a substrate;
disposing the layer of polymer defined with the plurality of holes on the bottom electrode;
patterning the bottom electrode by etching;
forming a sidewall of an insulating material in each of the plurality of holes; and
depositing the top electrode on the surface of the layer of polymer opposite to the bottom electrode.

18. The method of fabricating a fluidic apparatus in accordance with claim 17, wherein the top electrode and the bottom electrode are deposited by evaporation.

19. The method of fabricating a fluidic apparatus in accordance with claim 17, wherein the step of forming the sidewall in each of the plurality of holes comprises the step of evaporating the insulating material at a first deposition angle such that insulating material is deposited on a side in each of the plurality of holes to form the sidewall.

20. The method of fabricating a fluidic apparatus in accordance with claim 19, wherein the step of forming a pair of asymmetrical electrodes further comprises the steps of forming an etching mask by evaporating a masking material at a second deposition angle opposite to the first deposition angle.

21. A method of fabricating a fluidic apparatus, comprising the steps of:
providing a fluidic structure arranged to receive a sample containing a target substance;
providing a trapping structure in fluid communication with the fluidic structure, and arranged to immobilize the target substance in a detection region, wherein the target substance includes a plurality of nanosized units in a sample and each of the plurality of nanosized units have a dimension of between 50 and 500 nm; and
combining the fluidic structure with the trapping structure; wherein the detection region of the trapping structure is arranged to alter a physical characteristic of an incident light signal which represents a concentration of the target substance contained in the sample; wherein the step of providing a fluidic structure comprises the step of fabricating an imprinting stamp which define a fluidic cavity in the fluidic structure.

22. The method of fabricating a fluidic apparatus in accordance with claim 21, wherein the step of providing a fluidic structure further comprises the step of coating the stamp with a polymer and detaching the polymer from the stamp to form the fluidic structure.

23. The method of fabricating a fluidic apparatus in accordance with claim 21, wherein the step of providing a fluidic structure further comprises the step of etching a plurality of grooves on the stamp so as to define a plurality of ridges in the fluidic cavity in the fluidic structure.

24. The method of fabricating a fluidic apparatus in accordance with claim 23, wherein patterns on the stamp are defined by a hybrid nanoimprint and optical lithography process, and an etching process.

25. A method of fabricating a fluidic apparatus, comprising the steps of:
providing a fluidic structure arranged to receive a sample containing a target substance;
providing a trapping structure in fluid communication with the fluidic structure, and arranged to immobilize the target substance in a detection region, wherein the target substance includes a plurality of nanosized units in a sample and each of the plurality of nanosized units have a dimension of between 50 and 500 nm; and
combining the fluidic structure with the trapping structure; wherein the detection region of the trapping structure is arranged to alter a physical characteristic of an incident light signal which represents a concentration of the target substance contained in the sample; wherein the step of combining the fluidic structure with the trapping structure further comprises reating the fluidic structure using 02 plasma and bonding the fluidic structure to a substrate of the trapping structure.

26. The method of fabricating a fluidic apparatus in accordance with claim 25, wherein the fluidic structure includes a biocompatible polymer.

27. The method of fabricating a fluidic apparatus in accordance with claim 26, wherein the fluidic structure includes polydimethylsiloxane.

28. The method of fabricating a fluidic apparatus in accordance with claim 25, wherein the substrate of the trapping structure includes a transparent substrate.

29. The method of fabricating a fluidic apparatus in accordance with claim 28, wherein the substrate of the trapping structure includes a glass substrate.

30. A fluidic apparatus for detection of a chemical substance, comprising:
a fluidic structure arranged to receive a sample containing a target substance, wherein the target substance includes a plurality of nanosized units in a sample and each of the plurality of nanosized units have a dimension of between 50 and 500 nm; and
a trapping structure in fluid communication with the fluidic structure and arranged to immobilize the target substance in a detection region; wherein the detection region of the trapping structure is arranged to alter a physical characteristic of an incident light signal which represents a concentration of the target substance contained in the sample; the physical characteristic including an optical wavelength of the incident light signal; wherein an effective refractive index of the detection region is changed based on an amount of target substance immobilized by the trapping structure; wherein the fluidic apparatus is adapted to generate an extinction peak sensitive to the change of effective refractive index, where the peak is shifted as a result of an increase of the effective refractive index.

* * * * *